(12) United States Patent
Holm et al.

(10) Patent No.: US 11,513,018 B2
(45) Date of Patent: Nov. 29, 2022

(54) FIELD DEVICE HOUSING ASSEMBLY

(71) Applicant: Rosemount Inc., Shakopee, MN (US)

(72) Inventors: Jacob Daniel Holm, Savage, MN (US); Benjamin Hammerlind Jaffray, Wayzata, MN (US); Glen Rodney Edwards, Eagan, MN (US); Ryan Thomas Lindsey, Eden Prairie, MN (US); Paul Curtis Sundet, Burnsville, MN (US); Timothy R Meschke, Carver, MN (US); George Charles Hausler, Maple Grove, MN (US); Christopher Lee Eriksen, Saint Paul, MN (US)

(73) Assignee: ROSEMOUNT INC., Shakopee, MN (US)

( * ) Notice: Subject to any disclaimer, the term of this patent is extended or adjusted under 35 U.S.C. 154(b) by 42 days.

(21) Appl. No.: 17/039,222

(22) Filed: Sep. 30, 2020

(65) Prior Publication Data

US 2022/0099516 A1    Mar. 31, 2022

(51) Int. Cl.
*H05K 5/00* (2006.01)
*G01L 19/14* (2006.01)

(52) U.S. Cl.
CPC .......... *G01L 19/142* (2013.01); *H05K 5/0017* (2013.01)

(58) Field of Classification Search
CPC .............................. G01L 19/142; H05K 5/0017
See application file for complete search history.

(56) References Cited

U.S. PATENT DOCUMENTS

| | | | | |
|---|---|---|---|---|
| 1,860,904 A | * | 5/1932 | Remington | G01L 7/084 73/715 |
| 1,981,545 A | * | 11/1934 | Hammerling | A45D 33/005 132/305 |
| 2,855,579 A | * | 10/1958 | Wintriss | H05K 7/10 439/381 |

(Continued)

FOREIGN PATENT DOCUMENTS

| | | |
|---|---|---|
| FR | 2167150 A5 | 8/1973 |
| GB | 1402740 A | 8/1975 |
| WO | 2020120058 A1 | 6/2020 |

OTHER PUBLICATIONS

Notification of Transmittal of the International Search Report and Written Opinion of the International Searching Authority for PCT/US2021/033067, dated Sep. 9, 2021.

*Primary Examiner* — David J Bolduc
(74) *Attorney, Agent, or Firm* — Westman, Champlin & Koehler, P.A (57) ABSTRACT

Embodiments of the present disclosure are directed to field device housing assemblies and field devices that include the housing assemblies. One embodiment of the field device housing assembly includes a main housing, a cover having a proximal end connected to the main housing, a transparent panel and a retainer ring. An interior wall of the cover includes a threaded section that is concentric to a central axis, and a flange extending radially inward from the interior wall toward the central axis. The transparent panel is received within a socket defined by the interior wall and the flange. The retainer ring is secured to the threaded section of the interior wall. The transparent panel is clamped between the retainer ring and the flange.

30 Claims, 7 Drawing Sheets

(56) References Cited

U.S. PATENT DOCUMENTS

| | | | | |
|---|---|---|---|---|
| 2,955,352 A * | 10/1960 | Wintriss | | H05K 7/10 |
| | | | | 439/375 |
| 3,706,957 A * | 12/1972 | Iantorno | | H05K 7/12 |
| | | | | 439/560 |
| 3,737,609 A * | 6/1973 | Overkott | | C21D 9/02 |
| | | | | 219/149 |
| 4,841,777 A * | 6/1989 | Hershey | | G01L 19/0645 |
| | | | | 338/42 |
| 5,193,846 A * | 3/1993 | Allard | | B60R 21/217 |
| | | | | 280/728.2 |
| 5,554,809 A * | 9/1996 | Tobita | | G01L 19/146 |
| | | | | 345/55 |
| 5,656,782 A * | 8/1997 | Powell, II | | G01L 19/14 |
| | | | | 73/756 |
| 5,798,910 A * | 8/1998 | Holbeche | | H05K 5/063 |
| | | | | 174/559 |
| 5,937,758 A * | 8/1999 | Maracas | | H05K 3/1275 |
| | | | | 101/382.1 |
| 6,050,145 A * | 4/2000 | Olson | | G01L 19/147 |
| | | | | 73/756 |
| 6,382,448 B1 * | 5/2002 | Yuhara | | H05K 5/0017 |
| | | | | 220/62.22 |
| 6,422,532 B1 * | 7/2002 | Garner | | F16K 37/0058 |
| | | | | 137/487.5 |
| 6,457,367 B1 * | 10/2002 | Behm | | G01L 19/069 |
| | | | | 73/753 |
| 6,487,912 B1 * | 12/2002 | Behm | | G01L 19/0084 |
| | | | | 73/753 |
| 6,568,266 B1 * | 5/2003 | Desa | | G01L 19/0092 |
| | | | | 73/431 |
| 7,458,275 B2 * | 12/2008 | Kleven | | G01L 19/0084 |
| | | | | 73/756 |
| 7,956,738 B2 * | 6/2011 | Karschnia | | G05B 19/4185 |
| | | | | 340/508 |
| 8,049,361 B2 * | 11/2011 | Kielb | | H04L 12/40045 |
| | | | | 307/36 |
| 8,145,180 B2 * | 3/2012 | Brown | | G05B 19/4185 |
| | | | | 455/343.1 |
| 8,160,535 B2 * | 4/2012 | Kielb | | G08C 17/02 |
| | | | | 455/343.1 |
| 8,299,938 B2 | 10/2012 | Hedtke | | |
| 8,334,788 B2 * | 12/2012 | Hausler | | G01D 11/24 |
| | | | | 340/870.01 |
| 8,538,560 B2 * | 9/2013 | Brown | | G05B 19/4185 |
| | | | | 455/343.1 |
| 8,626,087 B2 * | 1/2014 | Vanderaa | | H02G 3/088 |
| | | | | 455/90.3 |
| 8,694,060 B2 * | 4/2014 | Vanderaa | | G08C 17/04 |
| | | | | 455/343.1 |
| 8,776,608 B2 * | 7/2014 | Hedtke | | G01L 13/025 |
| | | | | 73/717 |
| 8,787,848 B2 * | 7/2014 | Kielb | | G08C 17/02 |
| | | | | 710/106 |
| 8,847,571 B2 * | 9/2014 | Kielb | | G05B 19/0423 |
| | | | | 323/224 |
| 8,929,948 B2 * | 1/2015 | Vanderaa | | G01D 21/00 |
| | | | | 455/556.1 |
| 9,089,049 B2 | 7/2015 | Perrault et al. | | |
| 9,261,385 B2 * | 2/2016 | Loeffel | | G01D 5/00 |
| 9,674,976 B2 * | 6/2017 | Strei | | H05K 5/064 |
| 9,971,316 B2 * | 5/2018 | Jia | | G05B 13/02 |
| 10,102,985 B1 * | 10/2018 | Pelletier | | H01H 13/06 |
| 10,701,820 B1 * | 6/2020 | Jacobs | | H05K 5/0208 |
| 2003/0085200 A1 * | 5/2003 | Rosenkrans | | H01H 33/66261 |
| | | | | 218/154 |
| 2004/0047114 A1 * | 3/2004 | Turner | | G01D 11/24 |
| | | | | 220/4.07 |
| 2006/0274493 A1 * | 12/2006 | Richardson | | H05K 5/068 |
| | | | | 720/720 |
| 2008/0157235 A1 * | 7/2008 | Rogers | | H05K 1/0283 |
| | | | | 257/415 |
| 2010/0258331 A1 | 10/2010 | Dahlgren et al. | | |
| 2012/0111596 A1 * | 5/2012 | Mortun | | H01R 13/746 |
| | | | | 174/50.5 |
| 2015/0002753 A1 | 1/2015 | Perrault et al. | | |
| 2015/0155111 A1 * | 6/2015 | Kondrus | | H01H 3/20 |
| | | | | 200/43.13 |
| 2015/0208538 A1 * | 7/2015 | Clarke | | H05K 5/06 |
| | | | | 220/560.01 |
| 2015/0369684 A1 * | 12/2015 | Nguyen | | G01L 19/142 |
| | | | | 73/708 |
| 2016/0069765 A1 * | 3/2016 | Ishikawa | | G01L 9/0051 |
| | | | | 73/431 |
| 2018/0070468 A1 * | 3/2018 | Yanagisawa | | G04G 9/0064 |
| 2018/0275006 A1 * | 9/2018 | Osawa | | G01L 19/142 |
| 2018/0283972 A1 * | 10/2018 | Osawa | | G01L 15/00 |
| 2019/0029121 A1 * | 1/2019 | Gaertner, II | | H05K 3/284 |
| 2019/0253544 A1 * | 8/2019 | Hu | | G06F 1/1635 |
| 2020/0063884 A1 * | 2/2020 | Hurd | | G05D 7/0635 |
| 2020/0103386 A1 | 4/2020 | Lindsey et al. | | |
| 2021/0148778 A1 * | 5/2021 | Stopel | | G01L 19/0061 |
| 2021/0157198 A1 * | 5/2021 | Hu | | G06F 1/1658 |
| 2021/0356346 A1 * | 11/2021 | Hidaka | | G01L 19/142 |
| 2021/0360809 A1 * | 11/2021 | Ahn | | G02B 5/003 |

* cited by examiner

FIELD DEVICE HOUSING ASSEMBLY

FIELD

Embodiments of the present disclosure relate to industrial process field device housing assemblies and, more specifically to field device housing assemblies having multi-step joints for meeting flameproof and explosion-proof requirements.

BACKGROUND

Industrial process field devices, such as process transmitters, are used in industrial process control and monitoring systems to monitor industrial process variables using process sensors (e.g., pressure sensor, temperature sensor, etc.) and/or control one or more control devices (e.g., actuators, valves, etc.) that interact with an industrial process.

Many industrial process facilities are located in corrosive environments, or may be subject to a risk of fire, explosion, or vibration. As a result, industrial field devices must generally be constructed to be explosion-proof and otherwise able to withstand operating environment conditions. For example, a field device generally includes a housing assembly containing circuitry of the transmitter that is configured to meet applicable flameproof and explosion-proof standards, such as those imposed by the International Electrotechnical Commission (IEC) (e.g., requiring ATEX and IECx flameproof/explosion-proof certifications), Canadian Standards Association (CSA) and FM Global.

Some field devices are equipped with an user interface that allows a technician to configure the field device without having to access the interior of the housing assembly. The user interface may include a display, which is viewable through a window formed of plastic or glass formed in a cover of the housing assembly, and buttons that may be used to access menu items and enter settings.

The window formed in the cover presents a challenge to meet flameproof and explosion-proof requirements for the housing assembly. Conventional techniques utilize a potted joint around the circumference of the window that is filled with potting. Such a potted joint is problematic for many reasons including minimum joint lengths, significant manufacturing scrap, added complexity in the housing assembly, added overhead to potting control, qualification and testing, constraints related to sourcing, and temperature limitations of the potting. Additionally, because the potted joint doesn't allow for re-work, misalignment between the window and the cover may require the parts to be scrapped. Furthermore, voids may occur in the potting material, which can go undetected, and result in product failures.

Alternatives to the potted joint generally require extremely tight tolerancing to meet minimum gap spacing requirements in applicable approval standards. Such tight tolerancing results in high part costs.

SUMMARY

Embodiments of the present disclosure are directed to field device housing assemblies and field devices that include the housing assemblies. One embodiment of the field device housing assembly includes a main housing, a cover having a proximal end connected to the main housing, a transparent panel and a retainer ring. An interior wall of the cover includes a threaded section that is concentric to a central axis, and a flange extending radially inward from the interior wall toward the central axis. The transparent panel is received within a socket defined by the interior wall and the flange. The retainer ring is secured to the threaded section of the interior wall. The transparent panel is clamped between the retainer ring and the flange.

One embodiment of a field device includes a housing assembly and device circuitry contained within an interior cavity of the housing assembly. The housing assembly includes a main housing, a cover having a proximal end connected to the main housing, a transparent panel and a retainer ring. An interior wall of the cover includes a threaded section that is concentric to a central axis, and a flange extending radially inward from the interior wall toward the central axis. The transparent panel is received within a socket defined by the interior wall and the flange. The retainer ring is secured to the threaded section of the interior wall. The transparent panel is clamped between the retainer ring and the flange. The device circuitry includes a display that is viewable through the transparent panel.

Another embodiment of the field device includes a housing assembly and device circuitry contained within an interior cavity of the housing assembly. The housing assembly includes a main housing, a cover and a sealing member. The main housing includes a cylindrical side wall that is concentric to a central axis and has a threaded section at a distal end. The cover includes an annular socket that is concentric to the central axis. The distal end of the cylindrical side wall is received within the annular socket. The annular socket includes a side wall having a threaded portion in threaded engagement with the threaded section of the cylindrical side wall. The sealing member forms a seal between the cylindrical side wall and the annular socket. The device circuitry is configured communicate a process parameter value to an external location based on a received process sensor output, and/or control a process control device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

Figure 1:
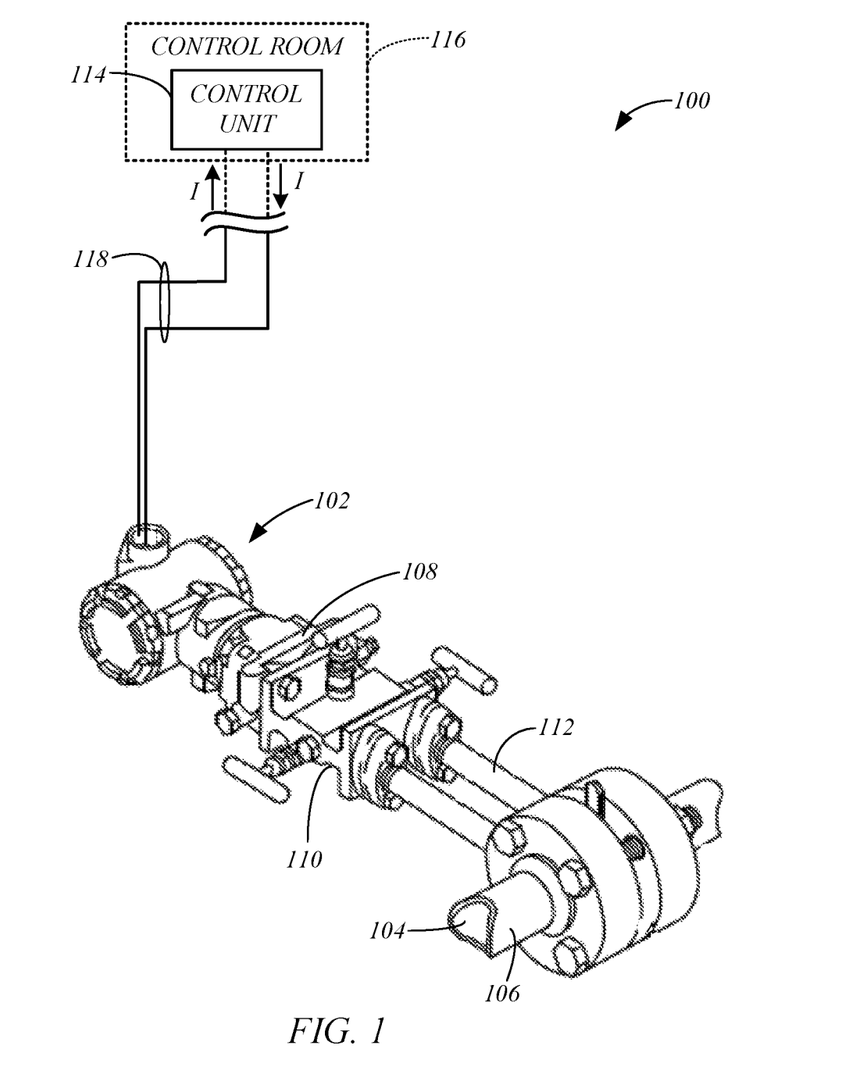
FIG. 1 is a simplified diagram of an exemplary industrial process measurement system, in accordance with embodiments of the present disclosure.

FIG. 1 is a simplified diagram of an exemplary industrial process measurement and/or control system 100, in accordance with embodiments of the present disclosure. The system 100 may be used in the processing of a material to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a field device 102, such as a process transmitter (e.g., a pressure transmitter), that is used to measure and/or control a process, such as a process medium 104. In some embodiments, the process medium 104 may be a fluid (i.e., liquid or gas) that is contained in or transported through a process vessel 106, such as a pipe (shown), a tank, or another process vessel. The field device 102 may be coupled to the vessel 106 through an adapter 108, a manifold 110 and a process interface 112, for example.

The field device 102 may communicate with a computerized control unit 114, which may be remotely located from the field device 102, such as in a control room 116, as shown in FIG. 1. The control unit 114 may be communicatively coupled to the field device 102 over a suitable physical communication link, such as a two-wire control loop 118, or a wireless communication link. Communications between the control unit 114 and the field device 102 may be performed over the control loop 118 in accordance with conventional analog and/or digital communication protocols. In some embodiments, the control loop 118 includes a 4-20 milliamp control loop, in which a process variable or other value may be represented by a level of a loop current I flowing through the control loop 118. Exemplary digital communication protocols include the modulation of digital signals onto the analog current level of the two-wire control loop 118, such as in accordance with the HART® communication standard. Other purely digital techniques may also be employed including FieldBus and Profibus communication protocols.

The field device 102 may also be configured to communicate wirelessly with the control unit 114 using a conventional wireless communication protocol. For example, the field device 102 may be configured to implement a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the field device 102 from any suitable power source. For example, the field device 102 may be wholly powered by the current I flowing through the control loop 118. One or more power supplies may also be utilized to power the field device 102, such as an internal or an external battery. An electrical power generator (e.g., solar panel, a wind power generator, etc.) may also be used to power the field device 102, or to charge a power supply used by the field device 102.

Figure 2:
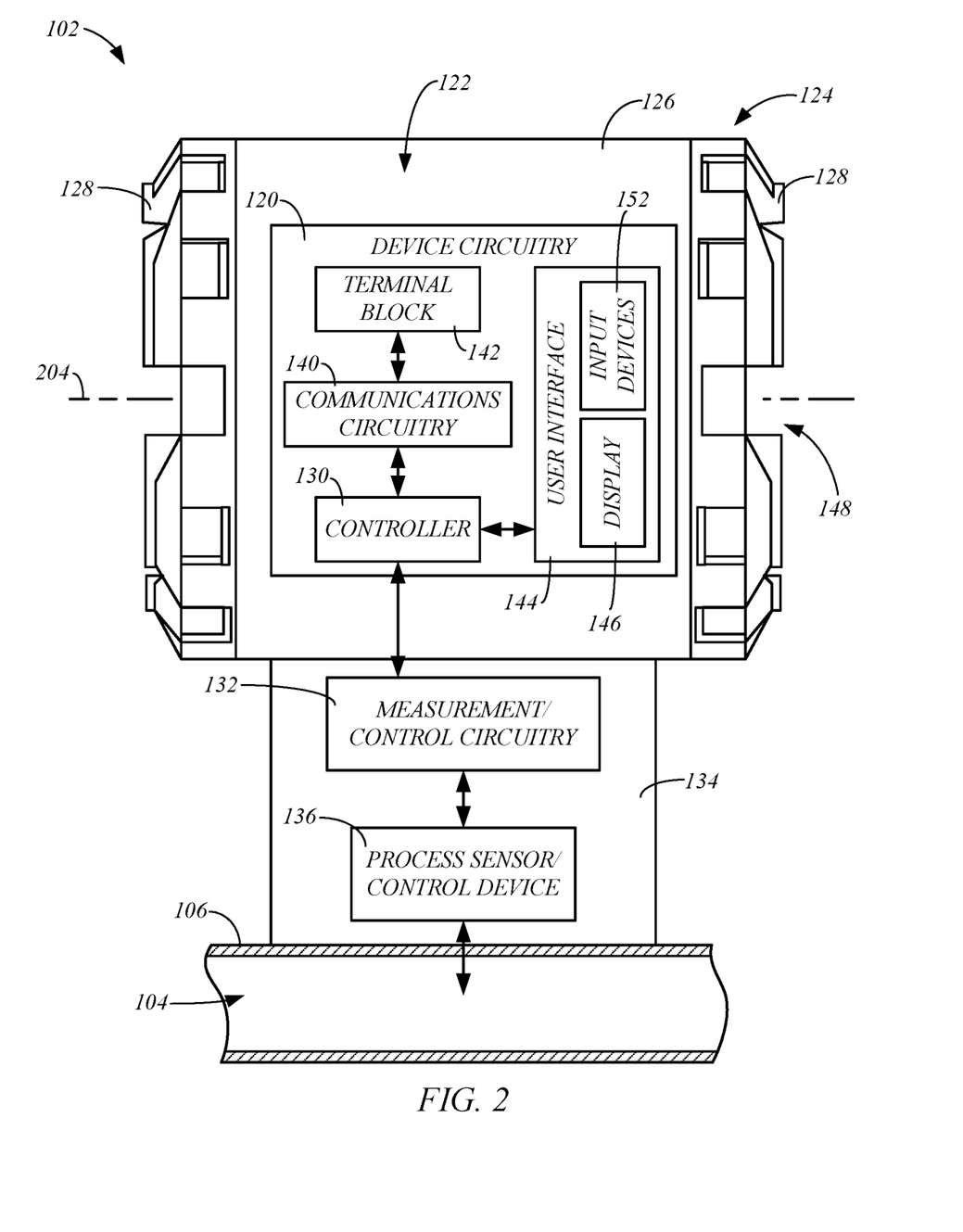
FIG. 2 is a simplified diagram of an example of a field device 102 in accordance with embodiments of the present disclosure.

FIG. 2 is a simplified diagram of an example of a field device 102, in accordance with embodiments of the present disclosure. In some embodiments, the field device 102 includes device circuitry 120 contained within an interior cavity 122 of a housing assembly 124. The housing assembly 124 includes a main housing 126 and one or more covers 128 that operate to seal the interior cavity 122. In some embodiments, the housing assembly 124 is designed to meet applicable flameproof and explosion-proof standards for field devices without the use of potting, such as those imposed by the IEC (e.g., IEC 60079-1:2014 § 5.2.9), the CSA (e.g., CSA C22.2 No. 30 R2016), and FM Global (e.g., FM3615:2018), for example.

Embodiments of the device circuitry 120 include a controller 130 configured to communicate with measurement or control circuitry 132, which may be contained within a separate module 134 to which the housing assembly 124 is connected. The controller 130 may communicate with the circuitry 132 using conventional techniques (e.g., feedthrough wires, etc.) while maintaining the flameproof and explosion proof properties of the housing assembly 124.

The controller 130 may represent one or more processors (i.e., microprocessor, central processing unit, etc.) that control components of the field device 102 to perform one or more functions described herein in response to the execution of instructions, which may be stored locally in patent subject matter eligible computer readable media or memory of the device 102. In some embodiments, the processors of the controller 130 are components of one or more computer-based systems. In some embodiments, the controller 130 includes one or more control circuits, microprocessor-based engine control systems, one or more programmable hardware components, such as a field programmable gate array (FPGA), for example. The controller 130 may also represent other conventional field device circuitry.

The measurement or control circuitry 132 represents circuitry that interacts with an active component 136 in the form of a process sensor and/or control device. Process sensor forms of the active component 136 may be used to sense or measure a parameter of the process 104, such as a temperature, a level, a pressure, a flow rate, or another parameter of the process 104 using one or more sensors represented by the active component 136. Exemplary process sensors 136 include pressure sensors, temperature sensors, level sensors, flow rate sensors, pH sensors, and/or other sensors used to sense or measure a process parameter. For example, the field device 102 shown in FIG. 1 is a pressure transmitter having one or more pressure sensors. The measurement or control circuitry 132 may translate an output from a process sensor 136 (e.g., process parameter value) and communicate the translated output to the controller 130.

Control device forms of the active component 136 generally represent devices that are configured to interact with an aspect of the process 104. Exemplary control devices 136 include actuators, solenoids, valves, and other conventional process control devices used in field devices to control a process involving the process material 104. The measurement or control circuitry 132 may control the control device 136 based on signals from the controller 130.

The device circuitry 120 may also include communications circuitry 140 that is generally configured to communicate with an external device, such as the control unit 114 (FIG. 1) using a suitable communication protocol, such as one of those mentioned above. For example, the communications circuitry 140 may receive signals from the controller 130, such as a process parameter value, and communicate the value to the control unit 114. Similarly, the communications circuitry 140 may receive control signals that are used by the controller 130 to control the control device 136. In some embodiments, the communications circuitry 140 utilizes a terminal block 142, which may be connected to the two-wire process control loop 118 (FIG. 1), to facilitate communications between the field device and the control unit.

Figure 3:
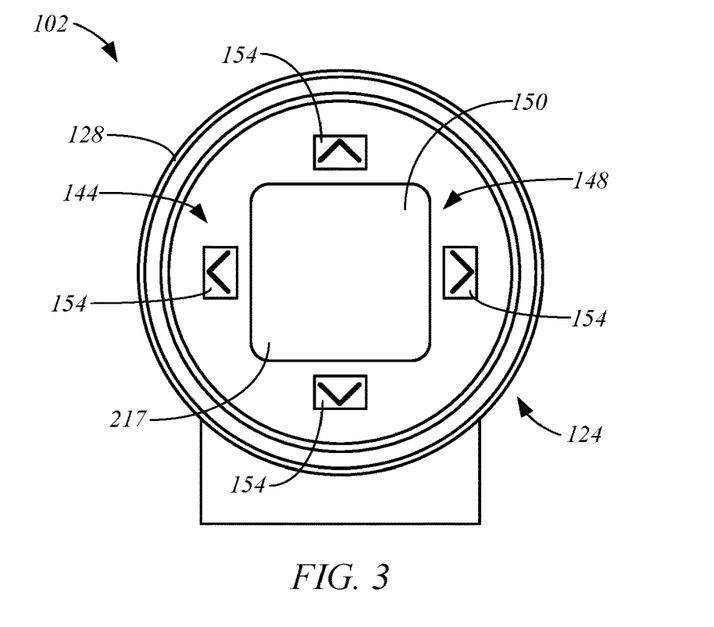
FIG. 3 is a simplified front view of an example of a field device housing assembly, in accordance with embodiments of the present disclosure.

In some embodiments, the device circuitry 120 includes circuitry for providing a user interface 144 comprising a display 146. The display 146 may include one or more liquid crystal displays (LCDs) with optional backlighting functionality, or as any other type of digital or analog display capable of producing a visual output. In some embodiments, the display 146 is viewable through a window 148 formed by a transparent panel (e.g., glass or plastic) in the cover 128 of the housing assembly 124, as shown in FIG. 3, which is a simplified front view of an example of the field device housing assembly 124, in accordance with embodiments of the present disclosure.

The user interface 144 may also include one or more input devices 152 to enable touch actuation input to the user interface 144 by an operator. In one embodiment, the input devices 152 may include one or more buttons 154 (e.g., capacitive buttons), examples of which are shown in FIG. 3. The buttons 154 may be configured as desired for particular applications. In some embodiments, the input devices 152 and the display 146 are located adjacent to one another, as shown in FIG. 3. For example, the buttons 154 may be formed on the cover 128 next to the window 148.

Figure 4:
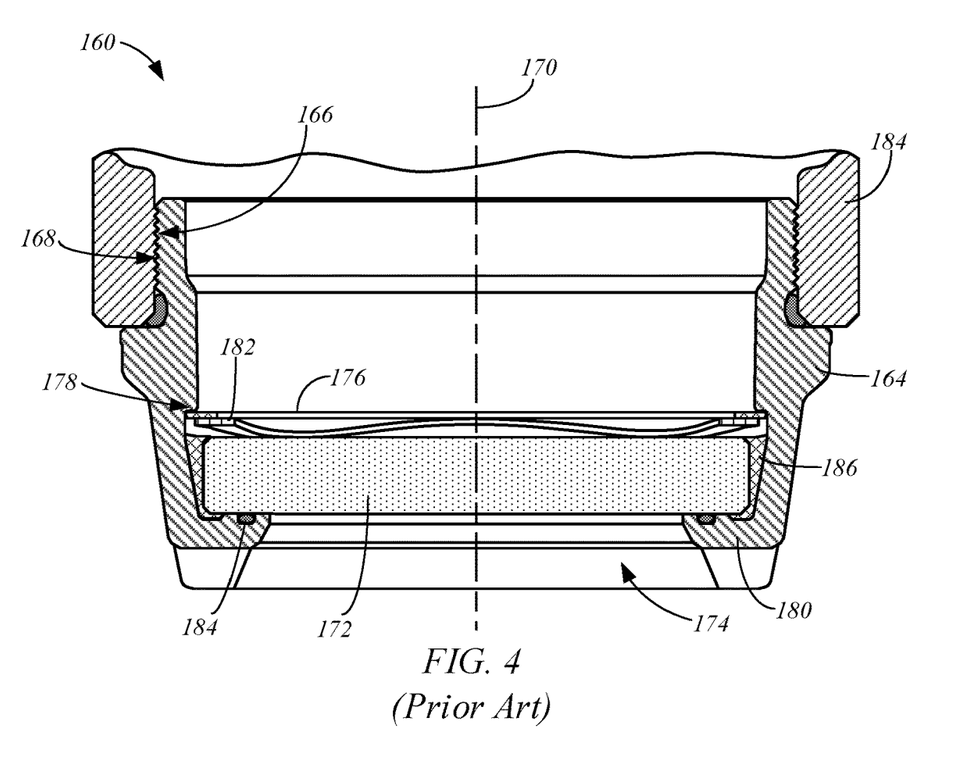
FIG. 4 is a simplified side cross-sectional view of a portion of a field device housing assembly, in accordance with the prior art.

As mentioned above, conventional techniques for meeting flameproof and explosion-proof standards for industrial process field devices have utilized a potted joint around the circumference of the transparent panel. An example of such a technique is shown in FIG. 4, which is a simplified side cross-sectional view of a portion of a field device housing assembly 160, in accordance with the prior art. The housing assembly 160 includes a main housing 162 and a cover 164, which operates to seal an interior cavity 166 of the main housing 162 to protect circuitry of the field device while meeting certain flameproof and explosion-proof standards.

The cover 164 may connect to the main housing 162 through a suitable threaded attachment formed by the threaded engagement between a threaded section 166 of the main housing 162 and a threaded section 168 of the cover 164, which are concentric to a central axis 170. The cover 164 includes a transparent panel 172 that forms a window 174 for viewing a display within the housing 160 through an opening in the end of the cover. A metal snap ring 176 is positioned beneath a shoulder 178, and the panel 172 is pressed against a flange 180 by a metal wave spring 182 that is compressed between the metal snap ring 176 and the panel 172. An O-ring 184 may be positioned within an annular groove of the flange to seal the junction between the panel 172 and the flange 180.

In order to meet flameproof and explosion-proof standards, a potted joint 186 is formed between the transparent panel 172 and the cover 164. The potted joint 186 is generally formed using urethane potting (e.g., parts A and B). Such a potted joint 186 is problematic for many reasons including minimum joint lengths, significant manufacturing scrap, added complexity in the housing assembly, added overhead to potting control, qualification and testing, constraints related to sourcing, and temperature limitations of the potting. Furthermore, alternatives to the potted joint 186 generally require extremely tight tolerancing to meet minimum gap spacing requirements in applicable approval standards. Such tight tolerancing drives high part costs. Additionally, because the potted joint doesn't allow for re-work, misalignment between the window and the cover or other issue may require the parts to be scrapped. Furthermore, voids may occur in the potting material, which can go undetected, and result in product failures.

Embodiments of the present disclosure are generally directed to field device housing assemblies 124 that provide alternatives to the use of potting to seal and meet flameproof and explosion-proof standards, such as the potted joint 186 of the prior art housing assembly 160 shown in FIG. 4, while avoiding issues with use of potting, such as those mentioned above including tight tolerancing and the inability to rework components, for example. Additional embodiments are directed to field devices 102 that include the field device housing assemblies 124 (FIG. 2).

FIGS. 5-12 are simplified side cross-sectional views of a portion of examples of housing assemblies 124, in accordance with embodiments of the present disclosure. Components of the user interface 144 (FIGS. 2 and 3) and other field device features are not shown in order to avoid obscuring embodiments of the present disclosure in unnecessary detail. Each of the housing assemblies 124 is configured to meet applicable flameproof and explosion-proof standards for field devices 102 without the use of potting, such as those imposed by the IEC (e.g., IEC 60079-1:2014 § 5.2.9), the CSA (e.g., CSA C22.2 No. 30 R2016), and FM Global (e.g., FM3615:2018), for example. Thus, in some embodiments, the housing assemblies 124 and the field devices 102 utilizing the housing assemblies 124 do not include potting or a potted joint. Instead, the housing assemblies 124 meet such flameproof and explosion-proof requirements through the formation of a multi-step joint and a spigot plus flange joint at the junction of the transparent panel 150 and the cover 128. The multi-step joint classification applies for ATEX and IECEx flameproof/explosion-proof approvals per the IEC standard, and the spigot plus flange joint applies to FM Global and CSA standards. In some embodiments, the spigot plus flange joint has a non-compliant gap, which removes the need for tight tolerances. In some embodiments, the multi-step joint/spigot plus flange joint results in a flamepath that turns a minimum of two times and by not less than ninety degrees (+/−5 degrees).

Figure 5:
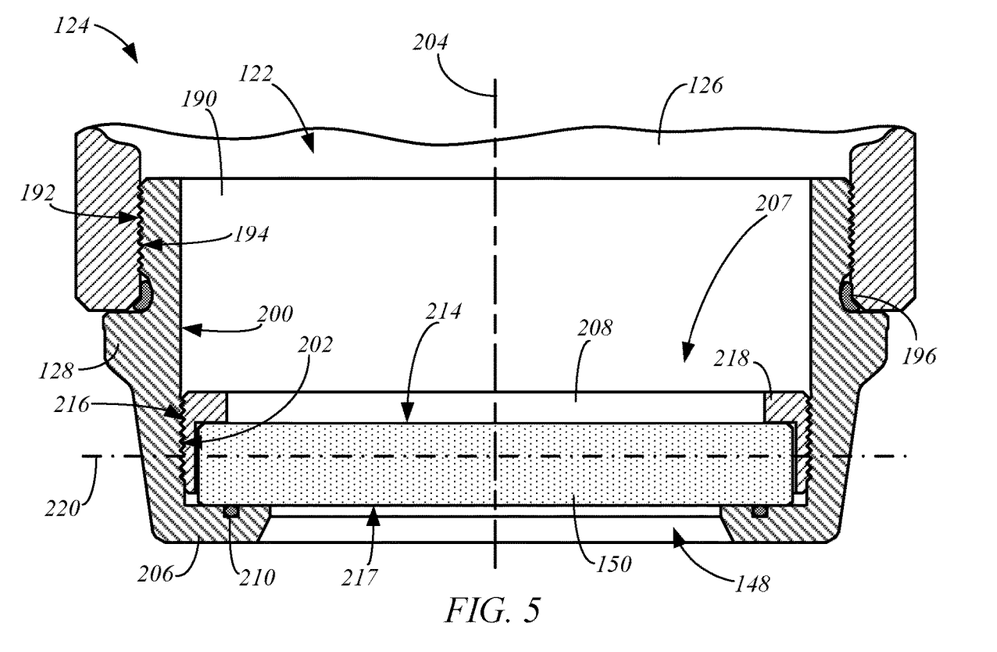
FIGS. 5-12 are simplified side cross-sectional views of a portion of examples of housing assemblies, in accordance with embodiments of the present disclosure.
Figure 6:
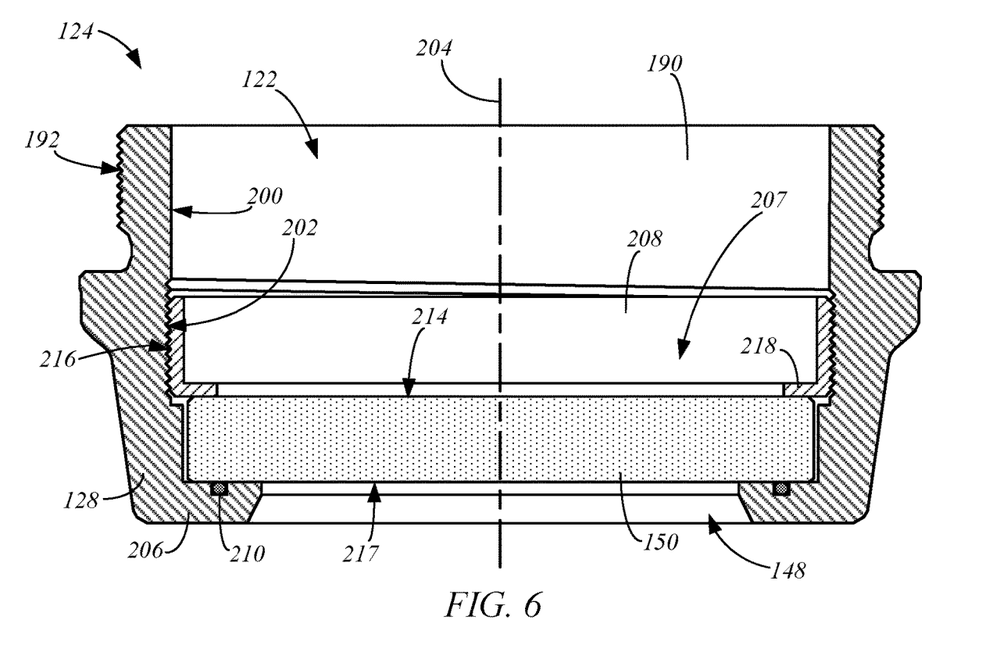

The housing assembly 124 example shown in FIG. 5 illustrates an example of a connection between a proximal end 190 of the cover 128 to the main housing 126. In some embodiments, the cover 128 includes a threaded section 192 that may be placed in threaded engagement with a corresponding threaded section 194 of the main housing. While the illustrated example shows the proximal end 190 of the cover being received within the interior 122 of the main housing 126, it is understood that this arrangement could be reversed. Other examples of the housing assembly 124 described herein may be connected to the main housing 126 in a similar manner as that shown in FIG. 5, or through another suitable technique. A suitable sealing member 196, such as an O-ring (shown) or another suitable sealing member, can be used to form a seal between the cover 128 and the main housing 126.

As shown in FIGS. 5-11, the cover 128 of the example housing assemblies 124 may include an interior wall 200 having a threaded section 202 that is concentric to a central axis 204, and a flange 206 extending radially inward from the interior wall 200 toward the central axis 204. The threaded section 202 may be used in place of the threaded section 192 to connect the cover 128 to the main housing 126 (not shown). The transparent panel 150 may be received within a socket 207 of the cover 128 that is defined by the interior wall 200 and the flange 206. A retainer ring 208 is secured to the threaded section 202 of the interior wall 200, such that the transparent panel 150 is clamped between the retainer ring 208 and the flange 206. A spigot plus flange joint and the multi-step joint are formed between the panel 150, the interior wall 200 and the flange 206.

Figure 8:
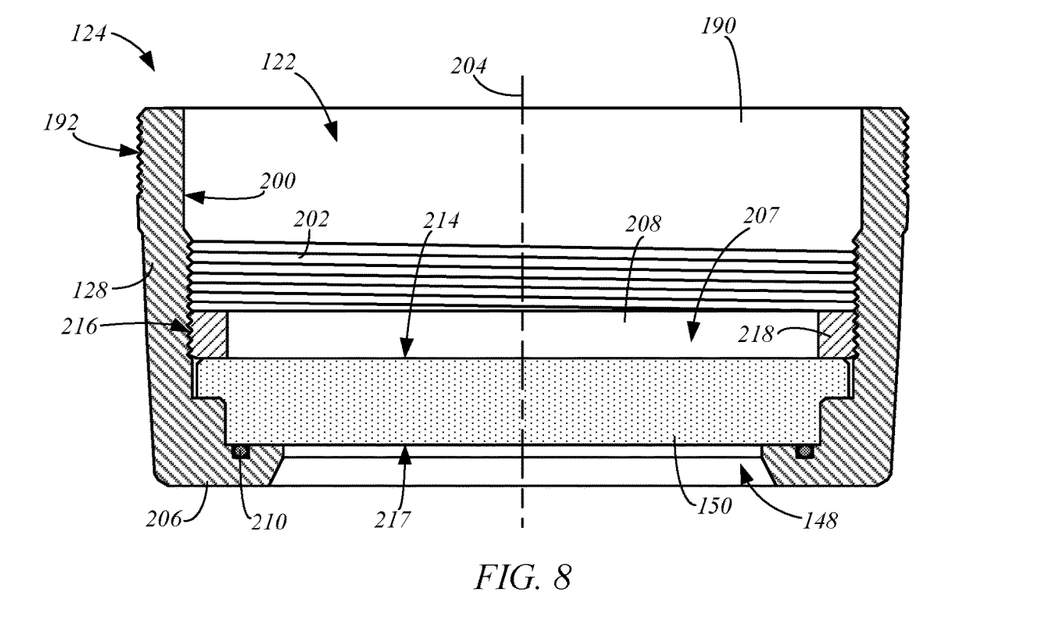
Figure 9:
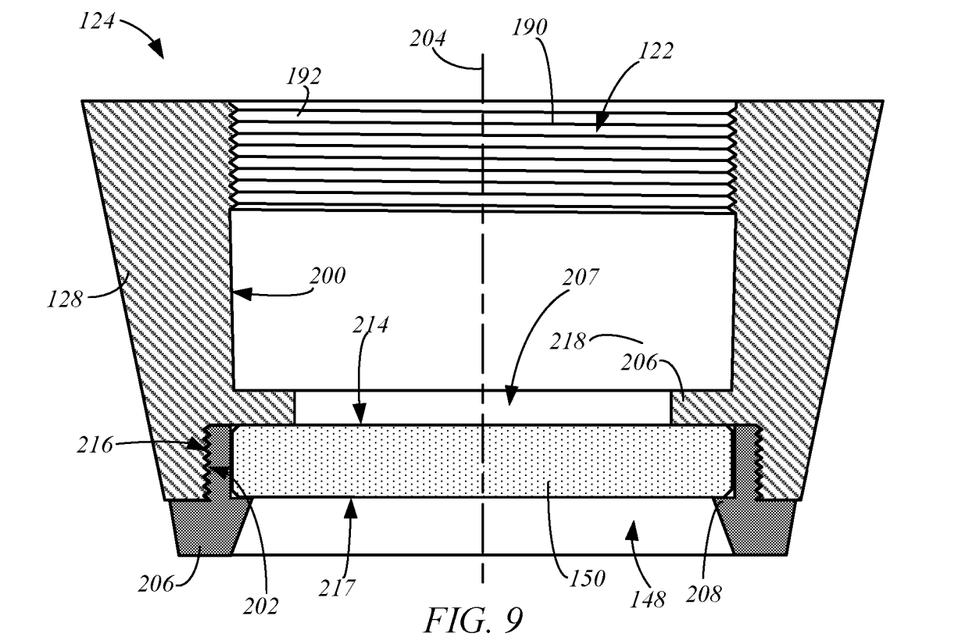

In some embodiments, a sealing member 210, such as an O-ring (shown) or another suitable sealing member, may be used to form a seal at the junction between the flange 206 and the transparent panel 150, such as between an exterior side 212 of the panel 150 and the flange 206 (FIGS. 5-8, 10 and 11), or between an interior side 214 of the panel 150 and the flange 206 (FIG. 9).

In some embodiments, the retainer ring 208 includes a threaded portion 216 that is concentric to the central axis 204 and may be screwed to the threaded section 202 of the interior wall 200. In this example, the retainer ring 208 may be a machined part. The threaded engagement between the threaded portion 216 of the retainer ring 208 and the threaded section 202 of the interior wall 200 secures the retainer ring 208 to the cover 128 and clamps the transparent panel 150 against the flange 206, such as shown in FIGS. 5-9 and 11.

As also shown in FIGS. 5-9 and 11, the retainer ring 208 may include a flange portion 218 that extends radially from the threaded portion 216 relative to the central axis 204 and over either the interior side 214 of the panel 150 that is exposed to the interior 122 of the cover 128 or the housing assembly 124 (FIGS. 5-8 and 11), or the exterior side 217 of the panel 150 (FIG. 9). In some embodiments, a clamping force is applied to the transparent panel 150 through the flange portion 218 of the retainer ring 208 and is counter-balanced by the flange 206 of the cover 128.

The threaded portion 216 of the retainer ring 208 may be positioned along the central axis 204 above the transparent panel 150, such as shown in FIGS. 6-8 and 11. This configuration may be used to maximize the width of the panel 150 and the viewing window 148. In some embodiments, the threaded portion 216 of the retainer ring 208 extends between the interior wall 200 of the cover 128 and the transparent panel 150, such that a plane 220 that is perpendicular to the central axis 204 extends through the transparent panel 150 and the retainer ring 208, as shown in FIG. 5. This configuration may be used to save space within the interior cavity 122 of the cover 128.

Figure 10:
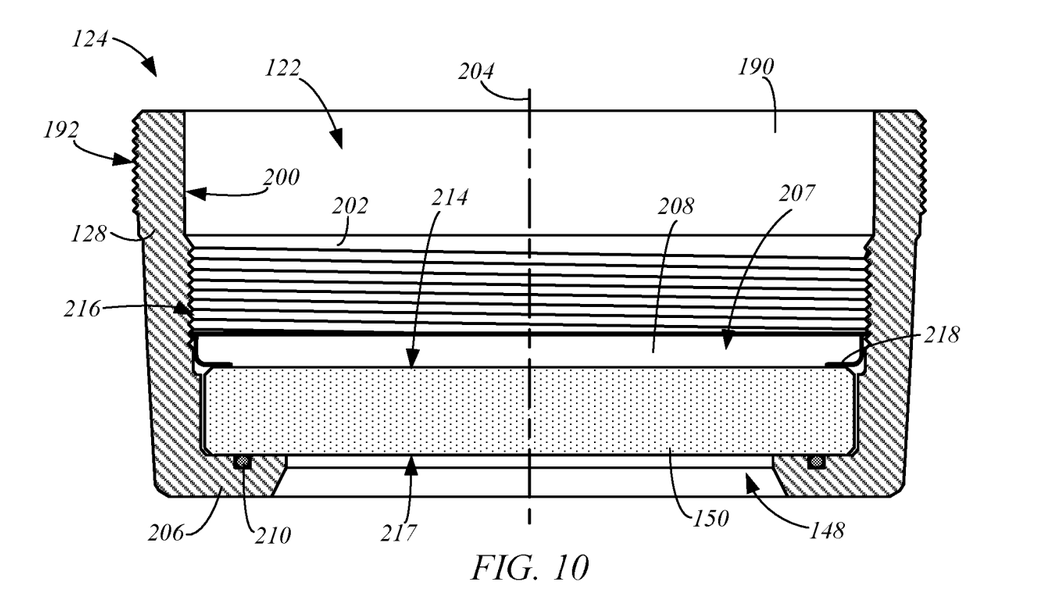
Figure 11:
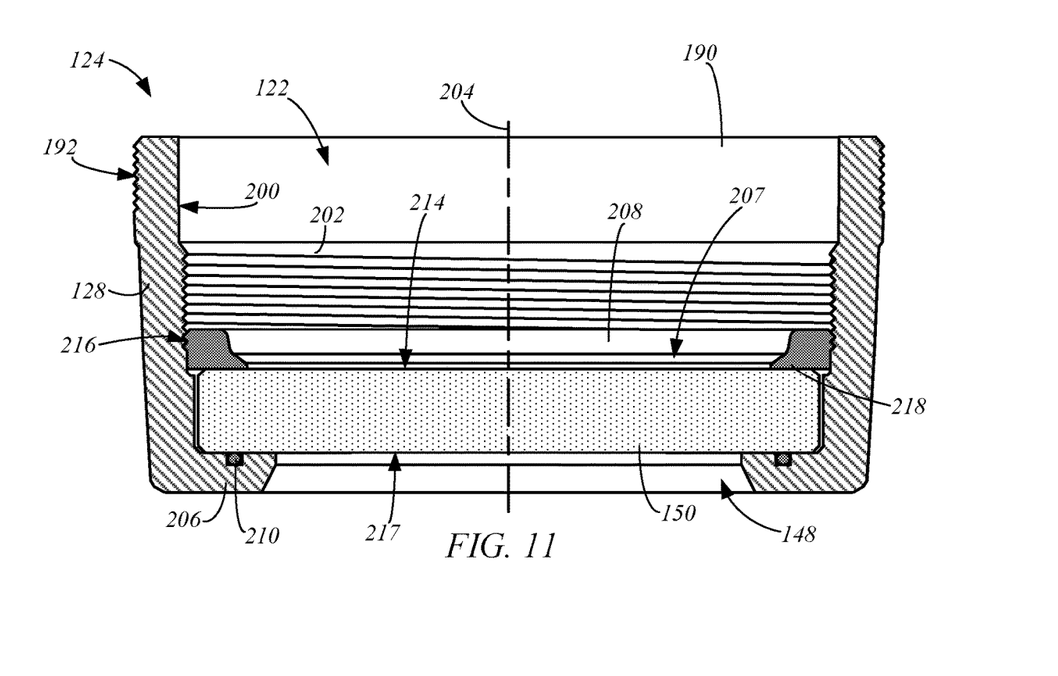

In one embodiment, the retainer ring 208 may take the form of a stamped sheet metal component, as shown in FIG. 10. Here, the retainer ring 208 may be pressed into the interior cavity 122 of the cover 128 and against the panel 150. A shoulder 222 of the retainer ring 208 engages the threaded section 202 of the interior wall 200 to secure the retainer ring 208 to the cover 128 and clamp the transparent panel 150 against the flange 206. The stamped sheet metal retainer ring 208 may also include helical threads allowing it to be screwed onto the threaded section 202 of the interior wall 200.

The multi-step joint and flange plus spigot joint formed between the transparent panel 150, the cover 128 and the retainer ring 208 form flamepaths that are configured to meet flameproof and explosion-proof standards, such as those mentioned above. In the examples shown in FIGS. 5-9 and 11, a first flamepath extends between the threaded portion 216 of the retainer ring 208 and the threaded section 202 of the interior wall 200 of the cover 128, and a second flamepath extends between the retainer ring 128 and the panel 150 and between the panel 150 and the flange 206. The multiple steps or ninety degree turns that are encountered by these flamepaths operate to satisfy flameproof and explosion-proof requirements.

The housing assemblies of FIGS. 5-11 illustrate different techniques for providing the multi-step flamepaths to meet field device flameproof/explosion-proof requirements. For example, in FIGS. 5 and 6, the length of the flamepath between the threaded portion 216 of the retainer ring 208 and the threaded section 202 of the interior wall 200 of the cover 128 may be extended as necessary to meet flameproof/explosion proof requirements, such as by having a minimum of eight threads for the threaded portion 216 and the threaded section 202, for example.

Figure 7:
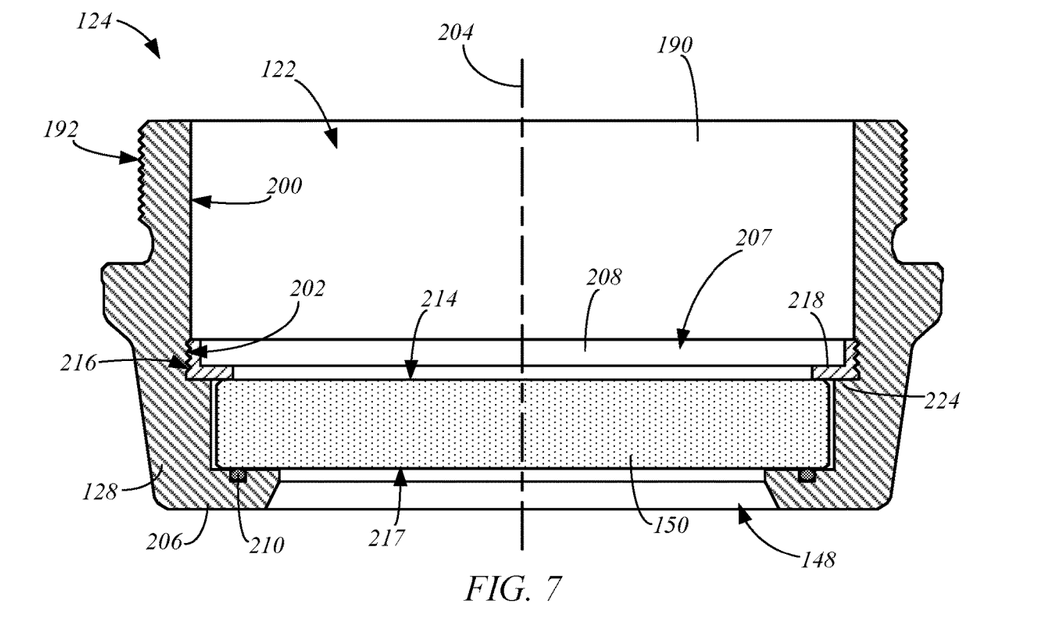

In the example housing assembly 124 shown in FIG. 7, the interior wall 200 of the cover 128 includes a shoulder or flange 224 extending radially relative to the central axis 204 from the threaded section 216. This creates a multi-step flamepath between the retainer ring 208 and the cover 128. The combination of this flamepath and the multi-step flamepath extending between the retainer ring 208 and the panel 150, and between the panel 150 and the cover 128, allow for a reduction in the number of threads of the threaded portion 216 of the retainer ring 208 and the threaded section 202 of the interior wall 202 of the cover 128 over the design shown in FIG. 5 while meeting flameproof and explosion-proof requirements.

In the example housing assembly 124 of FIG. 8, a multi-step path is formed between the transparent panel 150 and the cover 128 by configuring the panel 150 to have an annular step 230 in the side wall 232 extending between the interior side 214 and the exterior side 217 of the panel. The annular step 230 includes a cylindrical section 234 having a diameter 236, and a cylindrical section 238 having a diameter 240 that is smaller than the diameter 236. The interior wall 200 of the cover 128 may be formed to follow the contour of the annular step 230 by including a first wall section 242, a second wall section 244 and a flange section 246 extending radially relative to the central axis 204 from the first wall section 242 to the second wall section 244. An interior cavity portion 248 formed between the first wall section 242 and the flange section 246 receives the cylindrical section 234, and an interior cavity portion 250 formed between the section wall section 244 and the flange 206 receives the cylindrical section 238. Thus, this design includes a flamepath between the panel 150 and the cover 128 having three turns of ninety degrees over four segments to provide the desired multi-step path that satisfies flameproof and explosion-proof requirements, such as HLAC flameproof/explosion-proof approval tests.

Figure 12:
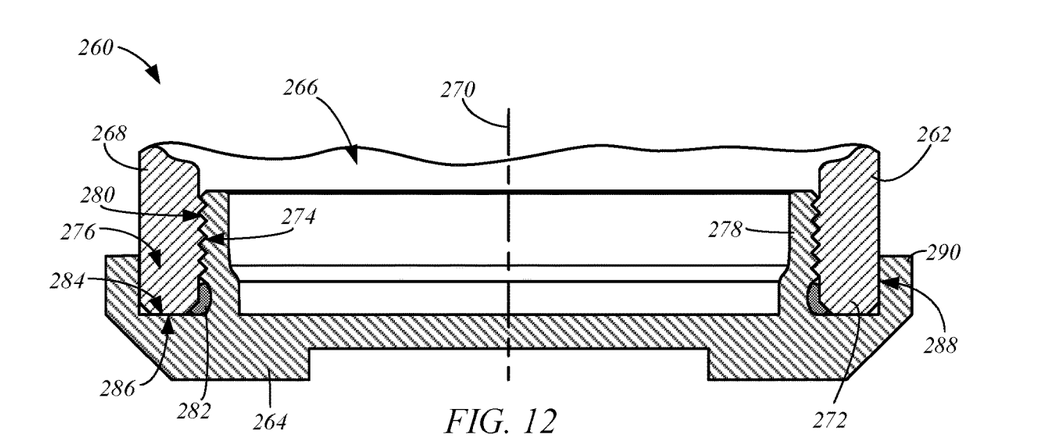

FIG. 12 is a simplified side cross-sectional view of a portion of a field device housing assembly 260, in accordance with embodiments of the present disclosure. In this embodiment, the housing assembly 260 includes a main housing 262 formed in accordance with one or more embodiments described above with regard to the main housing 126, and a cover 264 that is configured to seal an interior cavity 266 of the main housing 262 while meeting field device flameproof and explosion-proof requirements.

The main housing includes a cylindrical side wall 268 that is concentric to a central axis 270. A distal end 272 of the side wall 268 includes a threaded section 274. In one embodiment, the cover 264 includes an annular socket 276 that is concentric to the central axis 270. The annular socket 276 includes a side wall 278 having a threaded portion 280 that is configured to be screwed onto the threaded section 274 of the cylindrical side wall 268 of the main housing 262 to place the threaded portion 280 in threaded engagement with the threaded section 274, and secure the cover 264 to the main housing 262. A sealing member 282, such as an O-ring, may be used to form a seal between the cylindrical side wall 268 and the cover 264.

A field device 102 may use the housing assembly 260 in place of the housing assembly 124, such that the device circuitry 120 is contained within the interior cavity 266 of the housing assembly 260. The device circuitry 120 may be configured to communicate a process parameter value to an external location based on a received process sensor output, and/or control a process control device, as discussed above.

As with the housing assemblies 124 of FIGS. 5-11, embodiments of the housing assembly 260 do not utilize a potted joint or potting to satisfy flameproof and explosion-proof requirements. Rather, the annular socket 276 creates a multi-step flamepath for satisfying such requirements. For example, the flamepath for the housing assembly 260 extends from the interior cavity 266 along the junction of the threaded portion 280 of the annular socket 276 and the threaded section 274 of the side wall 268, between a flange section 284 of the annular socket 276 and an end 286 of the side wall 268, and between an exterior 288 of the side wall 268 and a segment 290 of the annular socket 276. Such a flamepath reduces the number of threads that are required by the threaded section 274 and the threaded portion 280, which helps to reduce the likelihood of thread galling issues.

Although the embodiments of the present disclosure have been described with reference to preferred embodiments, workers skilled in the art will recognize that changes may be made in form and detail without departing from the spirit and scope of the present disclosure.

What is claimed is:

1. A field device housing assembly comprising:
a main housing;
a cover having a proximal end connected to the main housing, an interior wall having a threaded section that is concentric to a central axis, and a flange extending radially inward from the interior wall toward the central axis;
a transparent panel received within a socket defined by the interior wall and the flange;
a retainer ring secured to the threaded section of the interior wall, wherein the transparent panel is clamped between the retainer ring and the flange;
wherein the transparent panel is flush with the interior wall and the retaining ring;
wherein a first edge of the transparent panel contacts the interior wall along a ninety-degree angle; and
wherein a second edge of the transparent panel contacts the retaining ring along a ninety-degree angle.

2. The assembly of claim 1, wherein the assembly does not include a potted joint between the transparent panel and the cover.

3. The assembly of claim 2, wherein a multi-step joint and a spigot plus flange joint is formed between the transparent panel, the interior wall of the cover and the retainer ring.

4. The assembly of claim 1, wherein the retainer ring includes a threaded portion in threaded engagement with the threaded section of the interior wall.

5. The assembly of claim 4, wherein:
the retainer ring includes a flange portion extending radially from the threaded portion relative to the central axis over a first surface of the transparent panel; and
the transparent panel is clamped between the flange portion of the retainer ring and the flange of the cover.

6. The assembly of claim 5, wherein the threaded portion of the retainer ring extends between the cover and the transparent panel, wherein a plane that is perpendicular to the central axis extends through the transparent panel and the retainer ring.

7. The assembly of claim 5, wherein an interior side of the transparent panel is clamped against the flange of the cover.

8. The assembly of claim 4, wherein:
an interior side of the transparent panel is exposed to an interior of the cover and is clamped against the flange portion of the retainer ring; and
an exterior side of the transparent panel is clamped against the flange of the cover.

9. The assembly of claim 4, wherein:
an interior side of the transparent panel is exposed to an interior of the cover and is clamped against the flange of the cover; and
an exterior side of the transparent panel is clamped against the flange portion of the retainer ring.

10. The assembly of claim 1, wherein the retainer ring is a stamped retainer ring.

11. The assembly of claim 1, wherein the transparent panel includes an interior side that is opposite an exterior side, and a side wall extending between the interior and exterior sides, the side wall including an annular step comprising first and second cylindrical sections that having different diameters.

12. The assembly of claim 11, wherein:
the interior wall of the cover includes a first wall section, a second wall section and a flange section extending radially relative to the central axis from the first wall section to the second wall section;
the first cylindrical section of the transparent panel is received within a first interior cavity portion of the cover formed by the first wall section and the flange section; and
the second cylindrical section of the transparent panel is received within a second interior cavity portion of the cover formed by the second wall section and the flange.

13. A field device comprising:
a housing assembly comprising:
a main housing;
a cover having a proximal end connected to the main housing, an interior wall having a threaded section that is concentric to a central axis, and a flange extending radially inward from the interior wall toward the central axis;
a transparent panel received within a socket defined by the interior wall and the flange; and
a retainer ring secured to the threaded section of the interior wall, wherein the transparent panel is clamped between the retainer ring and the flange;
wherein the transparent panel is flush with the interior wall and the retaining ring;
wherein a first edge of the transparent panel contacts the interior wall along a ninety-degree angle; and
wherein a second edge of the transparent panel contacts the retaining ring along a ninety-degree angle;
device circuitry including a display contained in an interior cavity of the housing assembly, wherein the display is viewable through the transparent panel.

14. The field device of claim 13, wherein the assembly does not include a potted joint between the transparent panel and the cover.

15. The field device of claim 14, wherein a multi-step joint and a spigot plus flange joint is formed between the transparent panel, the interior wall of the cover and the retainer ring.

16. The field device of claim 13, wherein the retainer ring includes a threaded portion in threaded engagement with the threaded section of the interior wall.

17. The field device of claim 16, wherein:
the retainer ring includes a flange portion extending radially from the threaded portion relative to the central axis over a first surface of the transparent panel; and
the transparent panel is clamped between the flange portion of the retainer ring and the flange of the cover.

18. The field device of claim 17, wherein the threaded portion of the retainer ring extends between the cover and the transparent panel, wherein a plane that is perpendicular to the central axis extends through the transparent panel and the retainer ring.

19. The field device of claim 17, wherein an interior side of the transparent panel is clamped against the flange of the cover.

20. The field device of claim 16, wherein:
an interior side of the transparent panel is exposed to an interior of the cover and is clamped against the flange portion of the retainer ring; and
an exterior side of the transparent panel is clamped against the flange of the cover.

21. The field device of claim 16, wherein:
an interior side of the transparent panel is exposed to an interior of the cover and is clamped against the flange of the cover; and
an exterior side of the transparent panel is clamped against the flange portion of the retainer ring.

22. The field device of claim 13, wherein the retainer ring is a stamped retainer ring.

23. The field device of claim 13, wherein the transparent panel includes an interior side that is opposite an exterior side, and a side wall extending between the interior and exterior sides, the side wall including an annular step comprising first and second cylindrical sections that having different diameters.

24. The field device of claim 23, wherein:
the interior wall of the cover includes a first wall section, a second wall section and a flange section extending radially relative to the central axis from the first wall section to the second wall section;
the first cylindrical section of the transparent panel is received within a first interior cavity portion of the cover formed by the first wall section and the flange section; and
the second cylindrical section of the transparent panel is received within a second interior cavity portion of the cover formed by the second wall section and the flange.

25. The field device of claim 13, wherein:
the field device includes a module attached to the field device housing assembly, the module including a process sensor having a sensor output corresponding to a sensed process parameter; and
the device circuitry is configured to communicate a parameter value to an external location based on the sensor output,
wherein the process sensor is selected from the group consisting of a pressure sensor, a temperature sensor, a level sensor, a flow rate sensor, and a pH sensor.

26. The field device of claim 13, wherein the device circuitry is configured to control a process control device selected from the group consisting of an actuator, a solenoid, and a valve.

27. A field device comprising:
a housing assembly comprising:
a main housing having a cylindrical side wall that is concentric to a central axis and includes a threaded section at a distal end;
a cover including an annular socket that is concentric to the central axis, wherein the distal end of the cylindrical side wall is received within the annular socket, and the annular socket includes a side wall having a threaded portion in threaded engagement with the threaded section of the cylindrical side wall;
a sealing member forming a seal between the cylindrical side wall and the annular socket; wherein a transparent panel is flush with the side wall and the sealing member; wherein a first edge of the transparent panel contacts the side wall along a ninety-degree angle; wherein a second edge of the transparent panel contacts the sealing member along a ninety-degree angle; and
device circuitry contained within an interior cavity of the housing assembly, and configured communicate a process parameter value to an external location based on a received process sensor output, and/or control a process control device.

28. The field device of claim 27, wherein the sealing member does not comprise a potted joint.

29. The field device of claim 28, wherein the sealing member includes an O-ring.

30. The field device of claim 27, further comprising a module attached to the housing assembly and including a sensor configured to generate the process sensor output based on a sensed process parameter, wherein the process sensor is selected from the group consisting of a pressure sensor, a temperature sensor, a level sensor, a flow rate sensor, and a pH sensor.

* * * * *